(12) United States Patent
Kashiwa et al.

(10) Patent No.: US 8,663,847 B2
(45) Date of Patent: Mar. 4, 2014

(54) POSITIVE ACTIVE MATERIAL FOR LITHIUM SECONDARY BATTERY, AND LITHIUM SECONDARY BATTERY

(75) Inventors: Yuta Kashiwa, Kyoto (JP); Mariko Kohmoto, Kyoto (JP); Toru Tabuchi, Kyoto (JP); Tokuo Inamasu, Kyoto (JP); Toshiyuki Nukuda, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 233 days.

(21) Appl. No.: 13/144,494

(22) PCT Filed: Nov. 27, 2009

(86) PCT No.: PCT/JP2009/070054
§ 371 (c)(1),
(2), (4) Date: Jul. 14, 2011

(87) PCT Pub. No.: WO2010/082402
PCT Pub. Date: Jul. 22, 2010

(65) Prior Publication Data
US 2011/0274975 A1    Nov. 10, 2011

(30) Foreign Application Priority Data
Jan. 15, 2009 (JP) ................. 2009-006460

(51) Int. Cl.
*H01M 4/13* (2010.01)

(52) U.S. Cl.
USPC ............. 429/231.3; 429/231.1; 429/221; 429/224; 429/209; 252/182.1; 423/594.1; 423/594.2; 423/594.5; 423/594.6; 423/594.15; 423/599

(58) Field of Classification Search
USPC ............. 429/221, 224, 231.3, 231.1, 209; 252/182, 1, 182.1; 423/594.1, 594.2, 423/594.5, 594.6, 594.15, 599
See application file for complete search history.

(56) References Cited

U.S. PATENT DOCUMENTS

| 8,357,468 B2 | 1/2013 | Exnar et al. |
| 2009/0186277 A1 | 7/2009 | Beck et al. |

FOREIGN PATENT DOCUMENTS

| JP | 2001-307731 | 11/2001 |
| JP | 2001-307732 | 11/2001 |
| JP | 2004-063422 | 2/2004 |

*Primary Examiner* — Laura Weiner
(74) *Attorney, Agent, or Firm* — Jianq Chyun IP Office

(57) ABSTRACT

It is an object of the present invention to provide a positive electrode material having a large ratio of the discharge capacity around 4 V to the total discharge capacity including the discharge capacity at 4V or lower while making the discharge capacity around 4 V sufficient, for the purpose of providing a lithium secondary battery using a lithium transition metal phosphate compound excellent in thermal stability, utilizing the discharge potential around 4V (vs. Li/Li$^+$) that is higher than the discharge potential of LiFePO$_4$, and being advantageous with respect to the detection of the end of discharge state, and a lithium secondary battery using the same. The present invention uses a positive active material for a lithium secondary battery containing a lithium transition metal phosphate compound represented by LiMn$_{1-x-y}$Fe$_x$Co$_y$PO$_4$ ($0.1 \leq x \leq 0.2$, $0 < y \leq 0.2$).

9 Claims, 5 Drawing Sheets

US 8,663,847 B2

POSITIVE ACTIVE MATERIAL FOR LITHIUM SECONDARY BATTERY, AND LITHIUM SECONDARY BATTERY

CROSS-REFERENCE TO RELATED APPLICATION

This application is a 371 of international application of PCT application serial no. PCT/JP2009/070054, filed on Nov. 27, 2009, which claims the priority benefit of Japan application no. 2009-006460, filed on Jan. 15, 2009. The entirety of each of the above-mentioned patent applications is hereby incorporated by reference herein and made a part of this specification.

TECHNICAL FIELD

The present invention relates to a lithium manganese iron phosphate-based compound usable as a positive active material for a lithium secondary battery, and a lithium secondary battery using the same.

BACKGROUND ART

In recent years, nonaqueous electrode secondary batteries typified by a lithium secondary battery having high energy density and good cycle performance and good self-discharge performance have drawn attention as power sources for portable equipments such as mobile phones, laptop computers, etc. and electric vehicle. Lithium secondary batteries presently in the main stream are those with 2 Ah or lower in compact sizes for consumer uses, mainly for mobile phones. As a positive active material for a lithium secondary battery, many of positive active materials have been proposed and most commonly known materials are lithium-containing transition metal oxides containing, as a basic configuration, such as a lithium cobalt oxide ($LiCoO_2$), a lithium nickel oxide ($LiNiO_2$), or a lithium manganese oxide ($LiMn_2O_4$) having a spinel structure with an operating voltage around 4 V. Especially, since the lithium cobalt oxide has excellent charge-discharge performance and energy density, it has been widely adopted for small consumer lithium secondary batteries having a battery capacity up to 2 Ah.

However, when a positive active material for a conventional small consumer lithium secondary battery is directly applied to lithium secondary batteries for industrial use, the battery safety is not necessarily fully satisfied. That is, in a positive active material for a conventional small consumer lithium secondary battery, the thermal stability of a lithium-containing transition metal oxide is not necessarily sufficient. In response, various countermeasures have been taken to improve the thermal stability of a lithium-containing transition metal oxide. However, such countermeasures have not yet been too satisfactory.

Further, when a conventional small consumer lithium secondary battery is used in an environment where a small consumer lithium secondary battery has not yet been used, that is, in a high-temperature environment where a lithium secondary battery for industrial use may be used, the battery life is extremely shortened as in the case of a nickel-cadmium battery or a lead battery. Meanwhile, a capacitor serves as a product that can be used for a long period of time even in a high-temperature environment. However, a capacitor does not have sufficient energy density, and thus does not satisfy the users' needs. Therefore, there is a demand for a battery that has long life at high temperature and sufficient energy density while maintaining safety.

Therefore, lithium iron phosphate ($LiFePO_4$), which is a polyanion positive active material excellent in heat stability, has drawn attention. Since the polyanion part of $LiFePO_4$ has a covalent bond of phosphorus and oxygen, $LiFePO_4$ releases no oxygen even at a high temperature and shows high safety even in the state where Li is completely pulled out of the Li sites and thus is suitable for remarkably inproving the safety of a battery by using $LiFePO_4$ as an active material for a battery. However, $LiFePO_4$ has an operating potential as low as around 3.4 V and results in a low energy density as compared with a conventional 4 V class positive active material. It corresponds to that the redox reaction of $Fe^{2+/3+}$ is caused around 3.4 V (vs. $Li/Li^+$).

On the other hand, the redox reaction of $Mn^{2+/3+}$ is caused around 4.1 V (vs. $Li/Li^+$) and accordingly, expecting attainment of the operating potential of around 4 V, lithium manganese phosphate ($LiMnPO_4$) obtained by using Mn for the transition metal part in substitution of Fe has been investigated; however the electron conductivity thereof is extremely low as compared with that of $LiFePO_4$ and thus there is a problem that the discharge capacity itself is scarcely obtained.

Further, lithium cobalt phosphate ($LiCoPO_4$) has been known. Since the redox reaction of $Co^{2+/3+}$ is caused around 4.8 V (vs. $Li/Li^+$), the operating potential of around 5 V can be obtained; however there is a problem that at such a noble potential, an electrolyte to be used is oxidative decomposition, it is difficult to use such a higher operating potential for a battery.

A reduction reaction that is electrochemical insertion of lithium into a lithium transition metal phosphate compound is promoted by a two-phase reaction, so that a flat potential region is caused around 3.4 V (vs. $Li/Li^+$) corresponding to the redox potential of $Fe^{2+/3+}$ in the case of $LiFePO_4$. Further, in the case where a plurality of elements which can be redox reaction are contained as a transition metal of lithium transition metal phosphate compound, theoretically, a plurality of flat potential regions corresponding to the redox potentials of the respective elements appear. For example, in $LiFe_aMn_{1-a}PO_4$, it is expected that two stages, a potential region around 3.4 V (vs. $Li/Li^+$) corresponding to the redox potential of $Fe^{2+/3+}$ and a potential region around 4.1 V (vs. $Li/Li^+$) corresponding to the redox potential of $Mn^{2+/3+}$, may be observed.

In the case where a material with a redox potential region around 4V as a positive active material is to be utilized mainly, it is important that two stages are observed in the discharge region as described above in terms of the function of detecting a battery state. That is, in the case of using a positive active material in which an electrochemical reduction reaction is promoted by in an homogeneous solid phase diffusion like $LiCoO_2$, the potential is gradually lowered along with the progress of discharge; whereas in the case of using a positive active material in which an electrochemical reduction reaction is promoted by two phase reaction like $LiFePO_4$, the potential is abruptly lowered only after being in the end of discharge and therefore, there is a problem that it is hard to detect the end stage of discharge of the battery. On the other hand, use of a positive active material like $LiFe_aMn_{1-a}PO_4$ in which two stages are observed in the discharge region makes it possible to use the discharge region around 3.4 V before the battery finally reaches the end of discharge and therefore, it is advantageous since the end stage of discharge of the battery can be detected easily.

Patent Document 1 discloses charge-discharge curves of batteries using $LiMn_{0.6}Fe_{0.4}PO_4$ (Example 1), $LiMn_{0.7}Fe_{0.3}PO_4$ (Example 2), and $LiMn_{0.75}Fe_{0.25}PO_4$ (Example 3) as a positive active material and, within the above-mentioned composition ratio, that is, describes that with respect to a lithium transition metal phosphate compound with a composition containing Mn and Fe as transition metal elements, within a composition ratio of Mn to Mn and Fe of 0.6 to 0.75, as the composition ratio of Mn is higher, the discharge region around 4 V corresponding to the redox potential of $Mn^{2+/3+}$ is widened more.

In the meantime, in consideration of the above-mentioned purpose, for the selection of a positive active material having a discharge region in which two stages are observed, it is not only sufficient that the positive active material has a high capacity (mAh/g) corresponding to the redox potential region around 4 V, but it is required for the positive active material to have a large ratio of discharge capacity around 4 V to the total discharge capacity of 4 V or lower including the discharge region of around 3.4 V. That is, this kind of positive active material for a secondary battery is a material which can carry out discharge at first by extraction of Li due to charge and therefore, even if the capacity corresponding to the flat redox potential region around 4 V is high, in the case where a material with a small ratio of discharge capacity around 4 V to the total discharge capacity of 4 V or lower is used, it needs to design a battery which is equipped with a negative electrode having a negative electrode material capable of inserting the amount of Li extracted at the initial charge and such a design is merely lower the energy density of the battery in vain and there is no advantageous point.

However, with respect to $LiFe_aMn_{1-a}PO_4$ described in Patent Document 1, in the case where the composition ratio of Mn is further increased in order to furthermore increase the ratio of discharge capacity around 4 V to the total discharge capacity, there is a problem that the total discharge performance itself is considerably worsened probably due to deterioration of the electron conductivity.

On the other hand, FIG. 5 and FIG. 11 of Patent Document 2 show discharge curves of batteries using $LiMnPO_4$ and $LiMn_{0.8}Co_{0.2}PO_4$, respectively, as a positive active material and a lithium metal foil as a negative electrode. However, in the discharge curve (FIG. 11) using $LiMn_{0.8}Cu_{0.2}PO_4$ obtained by partially substituting Mn with Co, two plat discharge regions are not observed and moreover, the discharge capacity in the voltage region around 4 V is observed very slightly in the total discharge capacity. It is supposed that high overvoltage causes a considerably bad effect under these discharge conditions, taking into consideration the fact that the capacity ratio around 4 V (vs. $Li/Li^+$) corresponding to the redox potential of $Mn^{2+/3+}$ is theoretically 100% in $LiMnPO_4$ and that the redox potential of $Co^{2+/3+}$ is further a noble potential.

In general, many trials for partially substituting the transition metal sites of a transition metal compound to be used for a positive active material for a lithium secondary battery with another element have been investigated, needless to exemplify such as $LiMn_2O_4$ with a tetragonal spinel structure in other active materials. However the effect which is caused by substitution with a different element differs depending of each active material (that is, a transition metal compound to be a mother body or an element to be used for substitution) and in this field of the art, it is beyond discussion that it is very difficult to predict whether the effect which is caused in one material can be caused in the same manner in another material.

In the case of using a battery, having a lithium transition metal phosphate compound as a positive active material in a region where the positive electrode potential is 4.5 V or lower, since the redox reaction of $Co^{2+/3+}$ is caused around 4.8 V (vs. $Li/Li^+$), it can be supposed theoretically that the more the content ratio of Co having a redox potential of 4.8 V as the transition metal element is increased, the lower the discharge capacity due to the fact that the ratio of the transition metal element capable of contributing to the electrode reaction is decreased.

Further, the above-mentioned Patent Document 1 neither describes nor suggests an object of increasing the ratio of discharge capacity in the potential region around 4 V while giving two flat potential regions, that is a potential region around 3.4 V (vs. $Li/Li^+$) and a potential region around 4.1 V (vs. $Li/Li^+$) but discloses as "the positive active material of the present invention contains a compound represented by a general formula $Li_xMn_yFe_{1-y}PO_4$ (wherein $0<x\leq 2$, $0.5<y<0.95$). In the positive active material configured as described above, $Li_xMn_yFe_{1-y}PO_4$ is obtained by partially substituting Mn with Fe. The Fe can inhibit the Jahn-Teller effect attributed to $Mn^{3+}$ and therefore, the strain of the crystal structure of $Li_xMn_yFe_{1-y}PO_4$ can be suppressed". Similarly, the above-mentioned Patent Document 2 neither describes nor suggests an object of increasing the ratio of discharge capacity in the potential region around 4 V while giving two flat potential regions but discloses as "the positive active material of the present invention has been completed based on such findings and contains a compound represented by a general formula $Li_xMn_yA_{1-y}PO_4$ (wherein $0<x\leq 2$, $0<y<1$, and A is one metal element selected from Ti, Zn, Mg, and Co). In the positive active material configured as described above, $Li_xMn_yA_{1-y}PO_4$, which is a phosphate compound having an olivine structure, is obtained by partially substituting Mn with one metal element A selected from Ti, Zn, Mg, and Co. The metal element A can inhibit the Jahn-Teller effect attributed to $Mn^{3+}$ and therefore, the strain of the crystal structure of $Li_xMn_yA_{1-y}PO_4$ can be suppressed".

As described above, neither Patent Document 1 nor Patent Document 2 describes or suggests any positive active materials which can increase the ratio of discharge capacity in the potential region around 4 V while giving two flat potential regions.

Patent Document 3 describes a result that $LiMn_{0.7}Fe_{0.25}Co_{0.05}PO_4$ (Sample 2) is more excellent in the discharge capacity (mAh/g) at 0.2 mA, the discharge capacity (mAh/g) at 2 mA, and the charge-discharge cycle performance than $LiMn_{0.7}Fe_{0.3}PO_4$ (Sample 14). However, Patent Document 3 also describes the discharge capacity (mAh/g) at 0.2 mA and the discharge capacity (mAh/g) at 2 mA of $LiMn_{0.8}Fe_{0.1}Ni_{0.1}PO_4$ (Sample 16) and $LiMn_{0.6}Fe_{0.2}Ni_{0.2}PO_4$ (Sample 17) are worsened as compared with those of $LiMn_{0.7}Fe_{0.3}PO_4$ (Sample 14) and the charge-discharge cycle performance is also worsened. That is, Patent Document 3 does not mention the compositions of $LiMn_{0.8}Fe_{0.1}Co_{0.1}PO_4$ and $LiMn_{0.6}Fe_{0.2}Co_{0.2}PO_4$; however discloses as "according to the present invention, as the compound having an olivine structure contained in the positive electrode as a positive active material is represented by a general formula $Li_aMn_bFe_cM_dPO_4$ (wherein M is one or more elements selected from Mg, Ti, V, Cr, Co, Ni, Cu, and Zn; $0<a<2$; $0<b<0.8$; $0<d<0.2$; and $b+c+d=1$), partial substitution of Mn and/or Fe with one or more elements selected from Mg, Ti, V, Cr, Co, Ni, Cu, and Zn causes a change of the electron state of the compound having an olivine structure due to the substituted element to increase the electron conductivity and therefore, the conductivity of the positive electrode can be improved." and Co and Ni are exemplified in parallel with each other without discrimination and therefore, it is suggested that compositions such as $LiMn_{0.8}Fe_{0.1}Co_{0.1}PO_4$ and $LiMn_{0.6}Fe_{0.2}Co_{0.2}PO_4$ obtained by using Co in place of Ni in the compositions of LiMn$_{0.8}$Fe$_{0.1}$Ni$_{0.1}$PO$_4$ (Sample 16) and LiMn$_{0.6}$Fe$_{0.2}$Ni$_{0.2}$PO$_4$ (Sample 17) may be extremely worse in the respective performances. Further, Patent Document 3 does not describe any charge-discharge curves and does not describe nor suggest whether the respective compositions give two flat potential regions and how much the ratio of the discharge capacity around 4 V is to the total discharge capacity.

PRIOR ART DOCUMENTS

Patent Documents

Patent Document 1: Japanese Patent Application Laid-Open (JP-A) No. 2001-307732
Patent Document 2: Japanese Patent Application Laid-Open (JP-A) No. 2001-307731
Patent Document 3: Japanese Patent Application Laid-Open (JP-A) No. 2004-063422

DISCLOSURE OF THE INVENTION

Problems to be Solved by the Invention

The present invention relates to a lithium manganese iron phosphate-based positive active material usable as a positive active material for a lithium secondary battery, and an object thereof is to provide a positive active material capable of sufficiently increasing the ratio of the discharge capacity around 4 V to the total discharge capacity including the discharge capacity at 4V or lower while increasing the discharge capacity around 4 V, and a lithium secondary battery using the same.

Solutions to the Problems

The configuration and effect of the present invention are as follows. However, the mechanism described herein include presumptions. Accordingly, whether such an mechanism is right or wrong does not limit the present invention at all.

A positive active material for a lithium secondary battery according to the present invention contains a lithium transition metal phosphate compound represented by the following general formula (1):

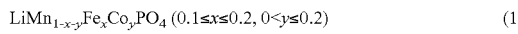

LiMn$_{1-x-y}$Fe$_x$Co$_y$PO$_4$ (0.1≤x≤0.2, 0<y≤0.2)   (1).

A lithium secondary battery according to the present invention has a positive electrode containing the above-mentioned positive active material, a negative electrode, and a nonaqueous electrolyte.

Effects of the Invention

The present invention relates to a lithium manganese iron phosphate-baed positive active material usable as a positive active material for a lithium secondary battery, and can provide a positive active material having a large ratio of the discharge capacity around 4 V to the total discharge capacity including the discharge capacity at 4V or lower while making the discharge capacity around 4 V sufficient. The present invention also provides a lithium secondary battery using the same.

DESCRIPTION OF EMBODIMENTS

Figure 1:
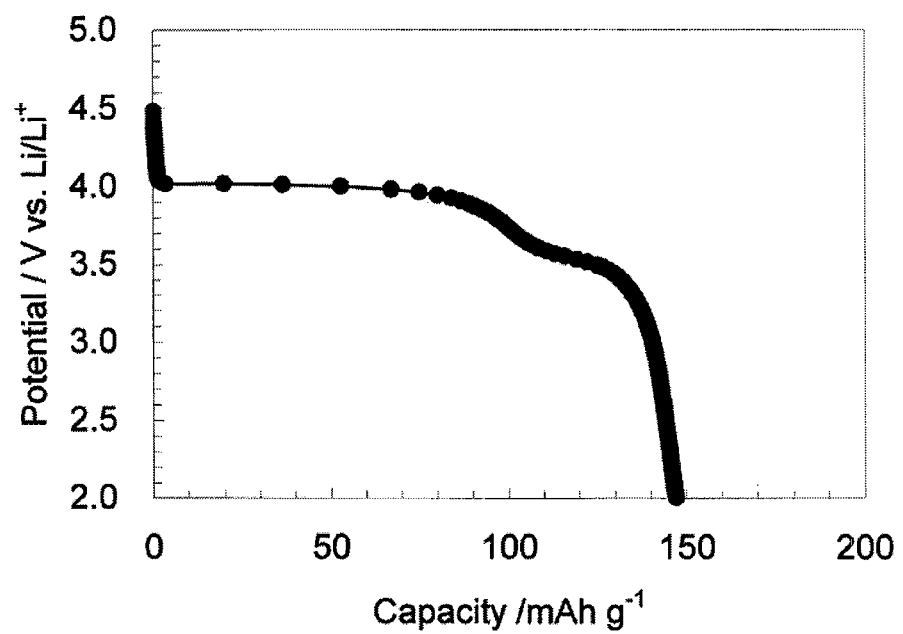
FIG. 1: A graph showing the result of measurement of the discharge curve of a battery using a positive active material of Example 3.

As described above, a positive active material for a lithium secondary battery according to the present invention contains a lithium transition metal phosphate compound represented by the general formula LiMn$_{1-x-y}$Fe$_x$Co$_y$PO$_4$ (0.1≤x≤0.2, 0<y≤0.2).

In the above-mentioned general formula LiMn$_{1-x-y}$Fe$_x$Co$_y$PO$_4$, if the content ratio x of Fe in the total transition metal elements is below 0.1, the electron conductivity of the lithium transition metal phosphate compound is inferior and therefore, no sufficient performance as a positive active material for a lithium secondary battery can be exhibited and moreover, two stages in the discharge region cannot be observed and consequently, it becomes difficult to detect the condition of the battery before the battery finally reaches the end of discharge. From the same viewpoint, x is preferably 0.15 or higher. Also, in the case where x is 0.2 or lower, the redox capacity around 4 V (vs. Li/Li$^+$) corresponding to the redox potential of Mn$^{2+/3+}$ can be sufficiently developed.

Further, a decrease of the discharge capacity at 4 V or lower due to Co addition can be suppressed by adjusting the content ratio y of Co to 0.2 or lower in the total transition metal elements and the amount of Co to be used, which is a rare metal, can be reduced, so that the material cost can keep down. From such viewpoints, the value of y is preferably 0.01 or higher, more preferably 0.02 or higher, and even more preferably 0.05 or higher. The value of y is also preferably 0.1 or lower.

With respect to the present invention, for the quantitative evaluation of the discharge capacity around 4 V or the ratio of the discharge capacity around 4 V to the total discharge capacity including the discharge capacity at 4 v or lower, the discharge ratio is preferably around 0.1 ItmA and vainly high rate discharge conditions should not be employed.

In this specification, "around 4 V" neither includes 4.5 V or higher nor less than 3.5 V.

In the positive active material of the present invention, inevitable impurities may coexist or impurities for improving the performances as an active material may coexist and in these cases, the effects of the present invention are not affected. The positive active material of the present invention may contain a very slight amount of a transition metal other than Mn, Fe, and Co, as well as boron. The positive active material of the present invention may partially contain $SiO_4$, $Si_2O_7$, etc. in the polyanionic part represented by $PO_4$.

On the other hand, the content ratio x of Fe and the content ratio y of Co are ratios based on the total amount of Mn, Fe, and Co. Accordingly, the values of x and y in the above-mentioned general formula (1) are calculated while excluding the elements of the above-mentioned impurities in the case where the impurities coexist in the positive active material of the present invention.

The content ratios of Mn, Fe, and Co can be determined by ICP emission spectroscopic analysis.

A synthesis process of the positive active material according to the present invention is not particularly limited if the synthesis provides a compound having composition satisfying the above-mentioned general formula (1) and containing Li[Mn, Fe, Co]$PO_4$ as a main phase. Concretely, examples thereof may include a solid-phase method, a liquid-phase method, a sol-gel method, and a hydrothermal synthesis method. Further, for the purpose of increasing the electron conductivity, it is preferable to allow the positive active material to load carbon in the particle surfaces by mechanical methods or methods such as thermal decomposition of organic matters.

The above-mentioned hydrothermal synthesis method can be employed conventionally known common methods. A method to be employed as the hydrothermal synthesis method may include, for example, a method of setting an aqueous solution obtained by dissolving raw materials of the lithium transition metal phosphate compound in tightly closeable container and thereafter heating the container from the outside of the container. More concretely, the method employed involves setting an aqueous solution obtained by dissolving raw materials of the lithium transition metal phosphate compound in tightly closeable container, tightly closing the container, heating the container at a temperature exceeding 100° C. from the outside of the container, and thereby adjusting the inner pressure to about 0.5 to 1.5 MPa.

Employment of the above-mentioned hydrothermal synthesis method in the hydrothermal synthesis process makes it easy to give smaller particles containing the lithium transition metal phosphate compound. Further, due to the smallness of the particles, it results in an advantage that the electronic conductivity of the positive active material containing the above-mentioned particulate active material can be increased.

More specifically, in the above-mentioned hydrothermal synthesis process, particles containing the lithium transition metal phosphate compound are produced by mixing raw materials containing manganese, lithium, iron, cobalt, and phosphate.

Various substances may be used as the raw materials. Concretely, examples usable as a raw material containing manganese (Mn) may include manganese sulfate, manganese oxalate, and manganese acetate. Examples usable as a raw material containing iron (Fe) may include iron sulfate, iron oxalate, and iron acetate. Examples usable as a raw material containing cobalt (Co) may include cobalt sulfate, cobalt oxalate, and cobalt acetate. Examples usable as a raw material containing lithium (Li) may include lithium hydroxide and lithium carbonate. Examples usable as a raw material containing phosphate ($PO_4$) may include phosphoric acid, ammonium phosphate, hydrogen diammonium phosphate, dihydrogen ammonium phosphate, and lithium phosphate.

The particles of the positive active material obtained in the above-mentioned manner have an olivine type crystal structure and contain the solid solution of a lithium transition metal phosphate compound having a chemical composition represented by the general formula (1).

The positive active material according to the present invention is preferable to be used in a positive electrode for a lithium secondary battery in the form of powders with an average particle size of 100 μm or lower. Particularly, it is more preferable as the particle size is smaller and the average particle diameter of secondary particles is preferably 0.5 to 20 μm, and the particle diameter of primary particles is preferably 1 to 500 nm. The specific surface area of the powder particles is preferably large for improving the high rate performance of the positive electrode and it is preferably 1 to 100 $m^2/g$. It is more preferably 5 to 100 $m^2/g$. In order to obtain a powder with a specified shape, a pulverizer or a classifier may be used. For example, a mortar, a ball mill, a sand mill, a vibration ball mill, a planetary ball mill, a jet mill, a counter jet mill, a swirling airflow type jet mill, a sieve, and the like may be used. At the time of pulverization, wet type pulverization may be employed in coexistence of water or an organic solvent such as alcohol or hexane. A classification method is not particularly limited and based on the necessity, dry or wet method using a sieve or an air classifier may be used.

In addition, the particle diameter of the positive active material according to the present invention can be calculated by image analysis from the observation results by a transmission electron microscope (TEM) and the specific surface area is a value measured as BET specific surface area by a nitrogen adsorption method.

It is preferable that the amount of water included in the positive electrode containing the positive active material of the present invention is less, and concretely, it is preferably less than 2000 ppm.

On the other hand, a negative electrode of the lithium secondary battery according to the present invention is not particularly limited and examples thereof include lithium metals, lithium alloys (lithium metal-containing alloys such as lithium-aluminum, lithium-lead, lithium-tin, lithium-aluminum-tin, lithium-gallium, and Wood's alloy), as well as alloys capable of insertion and extraction of lithium, carbon materials (e.g., graphite, hard carbon, low temperature sintered carbon, and amorphous carbon), metal oxides, lithium metal oxides ($Li_4Ti_5O_{12}$, etc.), and polyphosphoric acid compounds. Among them, graphite is preferable as the negative active material since it has an operating potential extremely close to that of lithium metal and it can carry out charge-discharge at a high operating voltage. For example, artificial graphite and natural graphite are preferable. Particularly, graphite obtained by modifying the surfaces of negative active material particles with amorphous carbon or the like causes lessgas generation during charging, and thus in more preferable.

Further, besides the above-mentioned main constituent components, conventionally known substances for a conductive agent and a binder may be used for the positive electrode and the negative electrode by conventionally known methods.

The conductive agent is not particularly limited if it is an electron conductive material which does not cause any adverse effect on the battery performance and generally, usable materials to be added may include one kind of conductive materials such as natural graphite (scaly graphite, flaky graphite, earthy graphite, etc.), artificial graphite, carbon black, acetylene black, Ketjen black, carbon whisker, carbon fibers, metal (copper, nickel, aluminum, silver, gold, etc.) powder, metal fibers, and conductive ceramic materials and a mixture of these substances.

The positive electrode and the negative electrode can be preferably produced by kneading the above-mentioned main constituent components (the positive active material in the positive electrode and the negative active material in the negative electrode) and other materials to obtain electrode composites, mixing the electrode composites in an organic solvent such as N-methylpyrrolidone, or toluene, thereafter, either applying or pressure-depositing the obtained mixture to or on current collectors described in detail below, and then subjecting the resulting current collectors to heat treatment at a temperature of about 50° C. to 250° C. for around 2 hours. The application method may be carried out preferably by employing a means such as roller coating using applicator rolls, screen coating, a doctor blade method, spin coating, or a bar coater to form coatings with arbitrary thickness and arbitrary shape, but the method is not limited thereto.

As the current collectors of the electrodes, iron, copper, stainless steel, nickel, and aluminum can be employed. Usable shapes for the current collectors may include sheets, foams, meshes, porous materials, and expanded lattices. Further, those obtained by forming holes in arbitrary shapes may be used as the current collectors.

Further, in relation to the energy density of a battery, the thickness of the electrode composite to be employed in the present invention is preferably 20 to 500 μm.

In general, a lithium secondary battery is composed of a positive electrode, a negative electrode, and a nonaqueous electrolyte obtained by adding an electrolyte salt in a nonaqueous solvent and generally, a separator is placed between the positive electrode and the negative electrode and an outer casing for housing these components is provided.

Examples of the nonaqueous solvent may include cyclic carbonates such as propylene carbonate and ethylene carbonate; cyclic esters such as γ-butyrolactone and γ-valerolactone; chain carbonate's such as dimethyl carbonate, diethyl carbonate, and methyl ethyl carbonate; chain esters such as methyl formate, methyl acetate and methyl butyrate; tetrahydrofuran or its derivatives; ethers such as 1,3-dioxane, 1,4-dioxane, 1,2-dimethoxyethane, 1,4-dibutoxyethane and methyldiglyme; nitriles such as acetonitrile and benzonitrile; dioxolane or its derivatives; ethylene sulfide, sulfolane, sultone, or their derivatives and these solvents may be used alone or in the form of a mixture of two or more of them, but the solvents are not limited thereto.

Examples of the electrolyte salt may include ionic compounds such as $LiBF_4$, and $LiPF_6$, and these ionic compounds may be used alone or in the form of a mixture of two or more of them. The concentration of the electrolyte salt in the nonaqueous electrolyte is preferably 0.5 mol/L to 5 mol/L and more preferably 1 mol/L to 2.5 mol/L in order to reliably obtain a lithium secondary battery with a high battery performance.

EXAMPLES

Hereinafter, a method for producing the lithium secondary battery of the present invention will be exemplified. In the following examples, lithium manganese iron phosphate-based positive active materials were synthesized by a hydrothermal synthesis method; however the present invention is not limited to the following embodiments.

Example 1

After $LiOH.H_2O$ and $(NH_4)_2HPO_4$ were Separately Dissolved in Ion exchanged water, the obtained both solutions were mixed while being stirred. Next, $MnSO_4.5H_2O$, $FeSO_4.7H_2O$, and $CoSO_4.7H_2O$ were dissolved in water in which ascorbic acid was dissolved. Herein, the amount of the ascorbic acid to $MnSO_4$ was adjusted to 0.1 by mole ratio. Next, this solution was added to the mixed solution of $LiOH.H_2O$ and $(NH_4)_2HPO_4$ to obtain a precursor solution. The precursor solution was prepared so as to give the ratio of Li:P:Mn:Fe:Co in the precursor solution of 2:1:0.79:0.2:0.01. After the obtained solution was transferred to a container made of polytetrafluoroethylene, the container was set in a reaction container and after the container was sufficiently purged with nitrogen gas and tightly closed and under stirring condition at 100 rpm, hydrothermal synthesis was carried out at 170° C. for 15 hours. After the reaction, a resulting precipitate obtained by filtration was sufficiently washed with deionized water and acetone and thereafter vacuum-dried at 120° C. for 6 hours to obtain a lithium transition metal phosphate compound. Polyvinyl alcohol (PVA) and water heated to 60° C. were added to the obtained product and mixed and kneaded in a mortar and thereafter, the mixture was heated at 700° C. for 1 hour under $N_2$ atmosphere to obtain a positive active material of Example 1.

Example 2

A positive active material of Example 2 was obtained in the same manner as in Example 1, except that the amounts of $MnSO_4.5H_2O$, $FeSO_4.7H_2O$, and $CoSO_4.7H_2O$ were adjusted so as to give the ratio of Li:P:Mn:Fe:Co in the precursor solution of 2:1:0.78:0.2:0.02.

Example 3

A positive active material of Example 3 was obtained in the same manner as in Example 1, except that the amounts of $MnSO_4.5H_2O$, $FeSO_4.7H_2O$, and $CoSO_4.7H_2O$ were adjusted so as to give the ratio of Li:P:Mn:Fe:Co in the precursor solution of 2:1:0.75:0.2:0.05.

Example 4

A positive active material of Example 4 was obtained in the same manner as in Example 1, except that the amounts of $MnSO_4.5H_2O$, $FeSO_4.7H_2O$, and $CoSO_4.7H_2O$ were adjusted so as to give the ratio of Li:P:Mn:Fe:Co in the precursor solution of 2:1:0.7:0.2:0.1.

Example 5

A positive active material of Example 5 was obtained in the same manner as in Example 1, except that the amounts of $MnSO_4.5H_2O$, $FeSO_4.7H_2O$, and $CoSO_4.7H_2O$ were adjusted so as to give the ratio of Li:P:Mn:Fe:Co in the precursor solution of 2:1:0.6:0.2:0.2.

Example 6

A positive active material of Example 6 was obtained in the same manner as in Example 1, except that the amounts of $MnSO_4.5H_2O$, $FeSO_4.7H_2O$, and $CoSO_4.7H_2O$ were adjusted so as to give the ratio of Li:P:Mn:Fe:Co in the precursor solution of 2:1:0.84:0.15:0.01.

Example 7

A positive active material of Example 7 was obtained in the same manner as in Example 1, except that the amounts of $MnSO_4.5H_2O$, $FeSO_4.7H_2O$, and $CoSO_4.7H_2O$ were adjusted so as to give the ratio of Li:P:Mn:Fe:Co in the precursor solution of 2:1:0.80:0.15:0.05.

Example 8

A positive active material of Example 8 was obtained in the same manner as in Example 1, except that the amounts of $MnSO_4.5H_2O$, $FeSO_4.7H_2O$, and $CoSO_4.7H_2O$ were adjusted so as to give the ratio of Li:P:Mn:Fe:Co in the precursor solution of 2:1:0.85:0.15:0.20.

Example 9

A positive active material of Example 9 was obtained in the same manner as in Example 1, except that the amounts of $MnSO_4.5H_2O$, $FeSO_4.7H_2O$, and $CoSO_4.7H_2O$ were adjusted so as to give the ratio of Li:P:Mn:Fe:Co in the precursor solution of 2:1:0.89:0.10:0.01.

Example 10

A positive active material of Example 10 was obtained in the same manner as in Example 1, except that the amounts of $MnSO_4.5H_2O$, $FeSO_4.7H_2O$, and $CoSO_4.7H_2O$ were adjusted so as to give the ratio of Li:P:Mn:Fe:Co in the precursor solution of 2:1:0.88:0.1:0.02.

Example 11

A positive active material of Example 11 was obtained in the same manner as in Example 1, except that the amounts of $MnSO_4.5H_2O$, $FeSO_4.7H_2O$, and $CoSO_4.7H_2O$ were adjusted so as to give the ratio of Li:P:Mn:Fe:Co in the precursor solution of 2:1:0.85:0.10:0.05.

Example 12

A positive active material of Example 12 was obtained in the same manner as in Example 1, except that the amounts of $MnSO_4.5H_2O$, $FeSO_4.7H_2O$, and $CoSO_4.7H_2O$ were adjusted so as to give the ratio of Li:P:Mn:Fe:Co in the precursor solution of 2:1:0.80:0.10:0.10.

Example 13

A positive active material of Example 13 was obtained in the same manner as in Example 1, except that the amounts of $MnSO_4.5H_2O$, $FeSO_4.7H_2O$, and $CoSO_4.7H_2O$ were adjusted so as to give the ratio of Li:P:Mn:Fe:Co in the precursor solution of 2:1:0.70:0.10:0.20.

Comparative Example 1

A positive active material of Comparative Example 1 was obtained in the same manner as in Example 1, except that no $CoSO_4.7H_2O$ was added and the ratio of Li:P:Mn:Fe in the precursor solution was adjusted to 2:1:0.8:0.2.

Comparative Example 2

A positive active material of Comparative Example 2 was obtained in the same manner as in Example 1, except that no $CoSO_4.7H_2O$ was added and the ratio of Li:P:Mn:Fe in the precursor solution was adjusted to 2:1:0.85:0.15.

Comparative Example 3

A positive active material of Comparative Example 3 was obtained in the same manner as in Example 1, except that no $CoSO_4.7H_2O$ was added and the ratio of Li:P:Mn:Fe in the precursor solution was adjusted to 2:1:0.875:0.125.

Comparative Example 4

A positive active material of Comparative Example 4 was obtained in the same manner as in Example 1, except that no $CoSO_4.7H_2O$ was added and the ratio of Li:P:Mn:Fe in the precursor solution was adjusted to 2:1:0.90:0.10.

Comparative Example 5

A positive active material of Comparative Example 5 was obtained in the same manner as in Example 1, except that no $CoSO_4.7H_2O$ was added and the ratio of Li:P:Mn:Fe in the precursor solution was adjusted to 2:1:0.95:0.05.

Comparative Example 6

A positive active material of Comparative Example 6 was obtained in the same manner as in Example 1, except that the amounts of $MnSO_4.5H_2O$, $FeSO_4.7H_2O$, and $CoSO_4.7H_2O$ were adjusted so as to give the ratio of Li:P:Mn:Fe:Co in the precursor solution of 2:1:0.90:0.05:0.05.

Comparative Example 7

A positive active material of Comparative Example 7 was obtained in the same manner as in Example 1, except that the amounts of $MnSO_4.5H_2O$, $FeSO_4.7H_2O$, and $CoSO_4.7H_2O$ were adjusted so as to give the ratio of Li:P:Mn:Fe:Co in the precursor solution of 2:1:0.75:0.05:0.20.

Comparative Example 8

A positive active material of Comparative Example 8 was obtained in the same manner as in Example 1, except that the amounts of $MnSO_4.5H_2O$, $FeSO_4.7H_2O$, and $CoSO_4.7H_2O$ were adjusted so as to give the ratio of Li:P:Mn:Fe:Co in the precursor solution of 2:1:0.48:0.50:0.02.

Comparative Example 9

A positive active material of Comparative Example 9 was obtained in the same manner as in Example 1, except that the amounts of $MnSO_4.5H_2O$, $FeSO_4.7H_2O$, and $CoSO_4.7H_2O$ were adjusted so as to give the ratio of Li:P:Mn:Fe:Co in the precursor solution of 2:1:0.45:0.50:0.05.

Comparative Example 10

A positive active material of Comparative Example 10 was obtained in the same manner as in Example 1, except that the amounts of $MnSO_4.5H_2O$, $FeSO_4.7H_2O$, and $CoSO_4.7H_2O$ were adjusted so as to give the ratio of Li:P:Mn:Fe:Co in the precursor solution of 2:1:0.40:0.50:0.10.

Comparative Example 11

A positive active material of Comparative Example 11 was obtained in the same manner as in Example 1, except that the amounts of $MnSO_4.5H_2O$, $FeSO_4.7H_2O$, and $CoSO_4.7H_2O$ were adjusted so as to give the ratio of Li:P:Mn:Fe:Co in the precursor solution of 2:1:0.58:0.40:0.02.

Comparative Example 12

A positive active material of Comparative Example 12 was obtained in the same manner as in Example 1, except that the amounts of $MnSO_4 \cdot 5H_2O$, $FeSO_4 \cdot 7H_2O$, and $CoSO_4 \cdot 7H_2O$ were adjusted so as to give the ratio of Li:P:Mn:Fe:Co in the precursor solution of 2:1:0.55:0.40:0.05.

Comparative Example 13

A positive active material of Comparative Example 13 was obtained in the same manner as in Example 1, except that the amounts of $MnSO_4 \cdot 5H_2O$, $FeSO_4 \cdot 7H_2O$, and $CoSO_4 \cdot 7H_2O$ were adjusted so as to give the ratio of Li:P:Mn:Fe:Co in the precursor solution of 2:1:0.50:0.40:0.10.

Comparative Example 14

A positive active material of Comparative Example 14 was obtained in the same manner as in Example 1, except that the amounts of $MnSO_4 \cdot 5H_2O$, $FeSO_4 \cdot 7H_2O$, and $CoSO_4 \cdot 7H_2O$ were adjusted so as to give the ratio of Li:P:Mn:Fe:Co in the precursor solution of 2:1:0.68:0.30:0.02.

Comparative Example 15

A positive active material of Comparative Example 15 was obtained in the same manner as in Example 1, except that the amounts of $MnSO_4 \cdot 5H_2O$, $FeSO_4 \cdot 7H_2O$, and $CoSO_4 \cdot 7H_2O$ were adjusted so as to give the ratio of Li:P:Mn:Fe:Co in the precursor solution of 2:1:0.65:0.30:0.050.

Comparative Example 16

A positive active material of Comparative Example 16 was obtained in the same manner as in Example 1, except that the amounts of $MnSO_4 \cdot 5H_2O$, $FeSO_4 \cdot 7H_2O$, and $CoSO_4 \cdot 7H_2O$ were adjusted so as to give the ratio of Li:P:Mn:Fe:Co in the precursor solution of 2:1:0.60:0.30:0.10.

(Charge and Discharge Test)

The discharge performance tests for positive active materials obtained in the above-mentioned examples and comparative examples were carried out by the following method.

First, a working electrode for evaluating each positive active material was produced in the following procedure. Each of the synthesized active materials and acetylene black (AB) were weighed at a mass ratio of 80:8 and thereafter pulverized and mixed in a mortar. Next, an N-methylpyrrolidone (NMP) solution of PVdF (product number: #1120) was added dropwise to each mixed powder so as to give the mass ratio converted to solid matter relative to the positive active material of 80 (positive active material): 12 (PVdF) and thereafter, a proper amount of NMP was added for adjusting the viscosity to obtain a positive electrode paste having a ratio of positive active material:AB:PVdF of 80:8:12 and a total solid matter concentration of 30 mass %. Each positive electrode paste was applied to an aluminum mesh plate, dried at 80° C. for 30 minutes, thereafter pressed, and vacuum-dried to obtain the working electrode. Metal Li was used for a counter electrode and a reference electrode, and a nonaqueous electrolyte was used to produce a triode glass cell. A solution obtained by dissolving $LiPF_6$ in a concentration of 1 mol/L in a mixed solvent of ethylene carbonate and diethyl carbonate at a volume ratio of 1:1 was used as the nonaqueous electrolyte.

The charge condition of the charge and discharge test was constant current and constant potential charge by adjusting the charge current to 0.1 ItmA and keeping the potential of 4.5 V (vs. $Li/Li^+$) for 15 hours after the potential reached 4.5 V. The discharge condition was constant current discharge at a discharge current of 0.1 ItmA and an final discharge potential of 2.0 V (vs. $Li/Li^+$).

First charge and discharge cycle was carried out, and whether two stages were observed in the discharge region was measured. Further, the discharge capacity was measured until the potential reached 3.7 V from the starting of discharge to define the measured discharge capacity as "discharge capacity (mAh) in the 4 V region" and the discharge capacity was measured until the voltage reached 2 V of the final discharge potential from the starting of discharge to define the discharge capacity as "total discharge capacity (mAh)" and thus values of "discharge capacity (mAh) in the 4 V region" and "total discharge capacity (mAh)" were determined and the value of "the ratio(%) of the discharge capacity in the 4 V region to the total discharge capacity" was determined. The results are shown in Tables 1 to 5 Tables 1 to 8.

TABLE 1

(x = 0.20)

| | $LiMn_{1-x-y}Fe_xCo_yPO_4$ | | | Presence or absence of two stages | Discharge capacity in 4 V region (mAh) | Total discharge capacity (mAh) | Ratio of discharge capacity in 4 V region to total discharge capacity (%) |
|---|---|---|---|---|---|---|---|
| | 1 − x − y | x | y | | | | |
| Comparative Example 1 | 0.80 | 0.20 | 0.00 | Presence | 75 | 148 | 50 |
| Example 1 | 0.79 | 0.20 | 0.01 | Presence | 79 | 148 | 53 |
| Example 2 | 0.78 | 0.20 | 0.02 | Presence | 86 | 134 | 64 |
| Example 3 | 0.75 | 0.20 | 0.05 | Presence | 102 | 147 | 70 |
| Example 4 | 0.70 | 0.20 | 0.10 | Presence | 101 | 138 | 73 |
| Example 5 | 0.60 | 0.20 | 0.20 | Presence | 89 | 122 | 73 |

TABLE 2

(x = 0.15)

| | LiMn$_{1-x-y}$Fe$_x$Co$_y$PO$_4$ | | | Presence or absence of two stages | Discharge capacity in 4 V region (mAh) | Total discharge capacity (mAh) | Ratio of discharge capacity in 4 V region to total discharge capacity (%) |
|---|---|---|---|---|---|---|---|
| | 1 − x − y | x | y | | | | |
| Comparative Example 2 | 0.85 | 0.15 | 0.00 | Presence | 69 | 122 | 56 |
| Example 6 | 0.84 | 0.15 | 0.01 | Presence | 93 | 127 | 73 |
| Example 7 | 0.80 | 0.15 | 0.05 | Presence | 93 | 140 | 67 |
| Example 8 | 0.65 | 0.15 | 0.20 | Presence | 97 | 122 | 80 |

TABLE 3

(x = 0.125)

| | LiMn$_{1-x-y}$Fe$_x$Co$_y$PO$_4$ | | | Presence or absence of two stages | Discharge capacity in 4 V region (mAh) | Total discharge capacity (mAh) | Ratio of discharge capacity in 4 V region to total discharge capacity (%) |
|---|---|---|---|---|---|---|---|
| | 1 − x − y | x | y | | | | |
| Comparative Example 3 | 0.875 | 0.125 | 0.00 | Presence | 37 | 60 | 62 |

TABLE 4

(x = 0.10)

| | LiMn$_{1-x-y}$Fe$_x$Co$_y$PO$_4$ | | | Presence or absence of two stages | Discharge capacity in 4 V region (mAh) | Total discharge capacity (mAh) | Ratio of discharge capacity in 4 V region to total discharge capacity (%) |
|---|---|---|---|---|---|---|---|
| | 1 − x − y | x | y | | | | |
| Comparative Example 4 | 0.90 | 0.10 | 0.00 | Presence | 59 | 77 | 77 |
| Example 9 | 0.89 | 0.10 | 0.01 | Presence | 76 | 113 | 67 |
| Example 10 | 0.88 | 0.10 | 0.02 | Presence | 78 | 116 | 66 |
| Example 11 | 0.85 | 0.10 | 0.05 | Presence | 88 | 130 | 68 |
| Example 12 | 0.80 | 0.10 | 0.10 | Presence | 87 | 124 | 70 |
| Example 13 | 0.70 | 0.10 | 0.20 | Presence | 85 | 106 | 80 |

TABLE 5

(x = 0.05)

| | LiMn$_{1-x-y}$Fe$_x$Co$_y$PO$_4$ | | | Presence or absence of two stages | Discharge capacity in 4 V region (mAh) | Total discharge capacity (mAh) | Ratio of discharge capacity in 4 V region to total discharge capacity (%) |
|---|---|---|---|---|---|---|---|
| | 1 − x − y | x | y | | | | |
| Comparative Example 5 | 0.95 | 0.05 | 0.00 | Absence | 67 | 93 | 71 |
| Comparative Example 6 | 0.90 | 0.05 | 0.05 | Absence | 88 | 122 | 72 |
| Comparative Example 7 | 0.75 | 0.05 | 0.20 | Absence | 39 | 57 | 68 |

TABLE 6

(x = 0.50)

| | LiMn$_{1-x-y}$Fe$_x$Co$_y$PO$_4$ | | | Presence or absence of two stages | Discharge capacity in 4 V region (mAh) | Total discharge capacity (mAh) | Ratio of discharge capacity in 4 V region to total discharge capacity (%) |
|---|---|---|---|---|---|---|---|
| | 1 − x − y | x | y | | | | |
| Comparative Example 8 | 0.48 | 0.50 | 0.02 | Presence | 71 | 150 | 47 |
| Comparative Example 9 | 0.45 | 0.50 | 0.05 | Presence | 69 | 146 | 47 |
| Comparative Example 10 | 0.40 | 0.50 | 0.10 | Presence | 63 | 137 | 46 |

TABLE 7

(x = 0.40)

| | LiMn$_{1-x-y}$Fe$_x$Co$_y$PO$_4$ | | | Presence or absence of two stages | Discharge capacity in 4 V region (mAh) | Total discharge capacity (mAh) | Ratio of discharge capacity in 4 V region to total discharge capacity (%) |
|---|---|---|---|---|---|---|---|
| | 1 − x − y | x | y | | | | |
| Comparative Example 11 | 0.58 | 0.40 | 0.02 | Presence | 82 | 148 | 55 |
| Comparative Example 12 | 0.55 | 0.40 | 0.05 | Presence | 82 | 144 | 57 |
| Comparative Example 13 | 0.50 | 0.40 | 0.10 | Presence | 79 | 138 | 57 |

TABLE 8

(x = 0.30)

| | LiMn$_{1-x-y}$Fe$_x$Co$_y$PO$_4$ | | | Presence or absence of two stages | Discharge capacity in 4 V region (mAh) | Total discharge capacity (mAh) | Ratio of discharge capacity in 4 V region to total discharge capacity (%) |
|---|---|---|---|---|---|---|---|
| | 1 − x − y | x | y | | | | |
| Comparative Example 14 | 0.68 | 0.30 | 0.02 | Presence | 83 | 147 | 56 |
| Comparative Example 15 | 0.65 | 0.30 | 0.05 | Presence | 93 | 148 | 63 |
| Comparative Example 16 | 0.60 | 0.30 | 0.10 | Presence | 91 | 139 | 65 |

In Comparative Examples 1 to 5 where the transition metal elements constituting the lithium transition metal phosphate compound were only Mn and Fe, the composition ratio of Mn to Mn and Fe was increased successively from 0.8 to 0.95, however, the discharge capacity in the 4 V region was decreased along with the increase of the Mn ratio and thereafter it was increased. Patent Document 1 describes that in the case where the transition metal elements of the lithium transition metal phosphate compound are only Mn and Fe and the composition ratio of Mn in Mn and Fe is in a range of from 0.6 to 0.75, the higher the composition ratio of Mn, the wider the discharge region around 4 V corresponding to the redox potential of Mn$^{2+/3+}$; however it can be understood that the technical finding described in Patent Document 1 is not applicable in the composition ratio of Mn in Mn and Fe in a range of 0.8 to 0.95.

Further, the followings were understood from Table 1. The positive electrode used for a lithium secondary battery of Comparative Example 1 involve a lithium transition metal phosphate oxide as a positive active material, which contained Mn and Fe at a ratio of 8:2 as transition metal elements and no Co. On the other hand, the positive electrodes used for lithium secondary batteries of Examples 1 to 5, which had compositions of the lithium transition metal phosphate compound obtained by partially substituting Mn with Co, showed improved discharge capacities in the 4 V region which was supposedly attributed to Mn, and also showed improved ratios of the discharge capacities in the 4 V region to the total discharge capacities as compared with the lithium secondary battery of Comparative Example 1. The same can be understood from Table 2.

Moreover, from Table 4, it was acknowledged that as compared with the lithium secondary battery of Comparative Example 4 using the lithium transition metal phosphate compound as a positive active material, which contained Mn and Fe at a ratio of 9:1 as the transition metal elements and no Co, the lithium secondary batteries of Examples 9 to 13 obtained by partially substituting Mn with Co were improved in discharge capacities in the 4 V region, which was supposedly attributed to Mn. In addition, in Table 4, the ratio of discharge capacity in the 4 V region to the total discharge capacity was decreased in Examples 9 to 13 as compared with that of Comparative Example 4; however this was simply because the total discharge capacity in Comparative Example 4 was significantly decreased, and the discharge capacity in the 4 V region in Comparative Example 4 became relatively high value.

As described above, in all of Examples 1 to 13, assuming of having large total discharge capacity (e.g. exceeding 100 mAh) and two stages were observed in the discharge region and the discharge capacity in the 4 V region was 70 mAh or higher and the ratio of the discharge capacity in the 4 V region to the total discharge capacity exceeded 50% and thus it was acknowledged that the effects of the present invention were exhibited.

In all of Examples 1 to 13, two stages are observed in the discharge region, and the graph of FIG. 1 shows the discharge curve of a battery using the positive active material of Example 3 as one example.

Although not shown in the tables, taking into consideration the fact that a positive active material which has sufficient discharge capacity around 4 V and at the same time a widened ratio of the discharge capacity around 4 V to the total discharge capacity including the discharge capacity at 4 V or lower is obtained, as one of indexes, in respective examples and comparative examples, based on comparison of the product calculated by the value of "the discharge capacity (mAh) in the 4 V region" and the value of "the ratio (%) of the discharge capacity in the 4 V region to the total discharge capacity" in examples and comparative examples, it can be understood that the effects due to the configuration of the present invention are remarkably significant and extremely practically usable.

Further, in order to further investigate the effect of the "content ratio x of Fe" on the "ratio of the discharge capacity in the 4 V region to the total discharge capacity" from another viewpoint, the measurement results of examples and comparative examples in which the content ratio y of Co was the same were put in order. When graphs were produced by plotting the "content ratio x of Fe" in the horizontal axis and the "ratio of discharge capacity around 4V to the total discharge capacity" in the vertical axis in the cases where the content ratio y of Co was 0.02, 0.05, and 0.1, the graphs shown in FIG. 2 to FIG. 4 were obtained.

Figure 2:
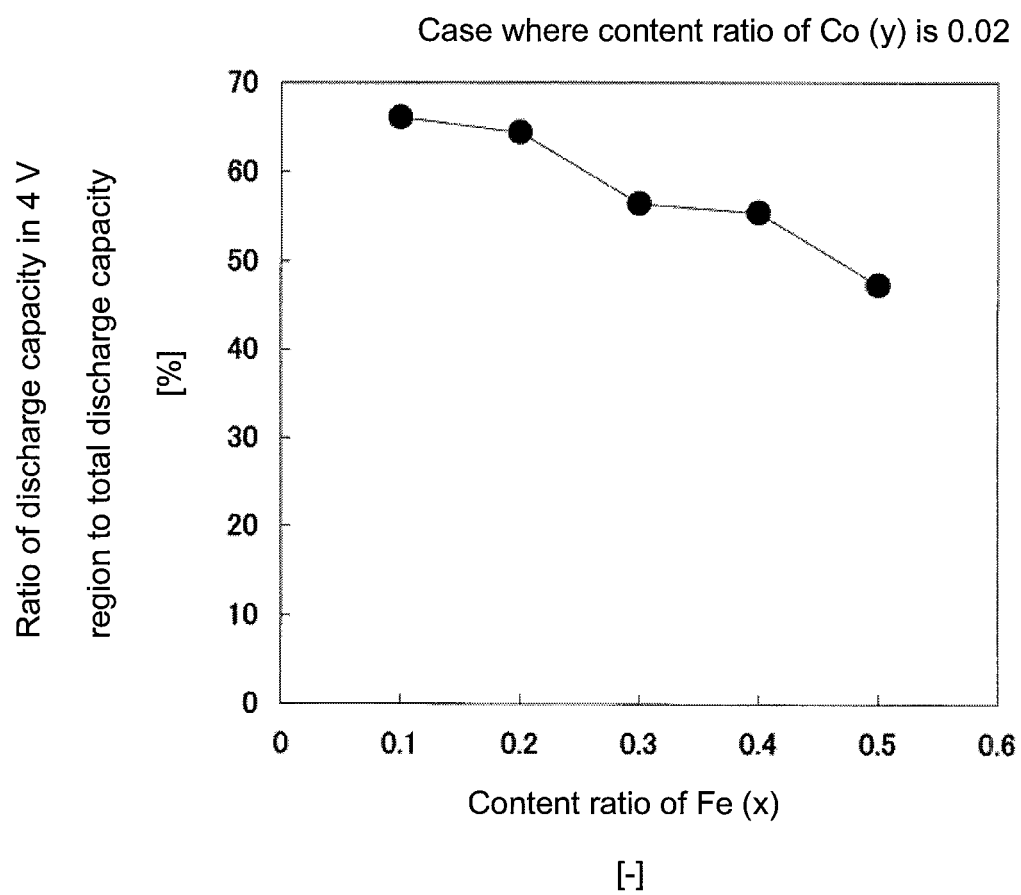
FIG. 2: A graph obtained by plotting "content ratio x of Fe" in the horizontal axis and "ratio of the discharge capacity around 4V to the total discharge capacity" in the vertical axis, regarding the measurement result in the case where the ratio of Co is 0.02, based on the test results of examples and comparative examples.
Figure 3:
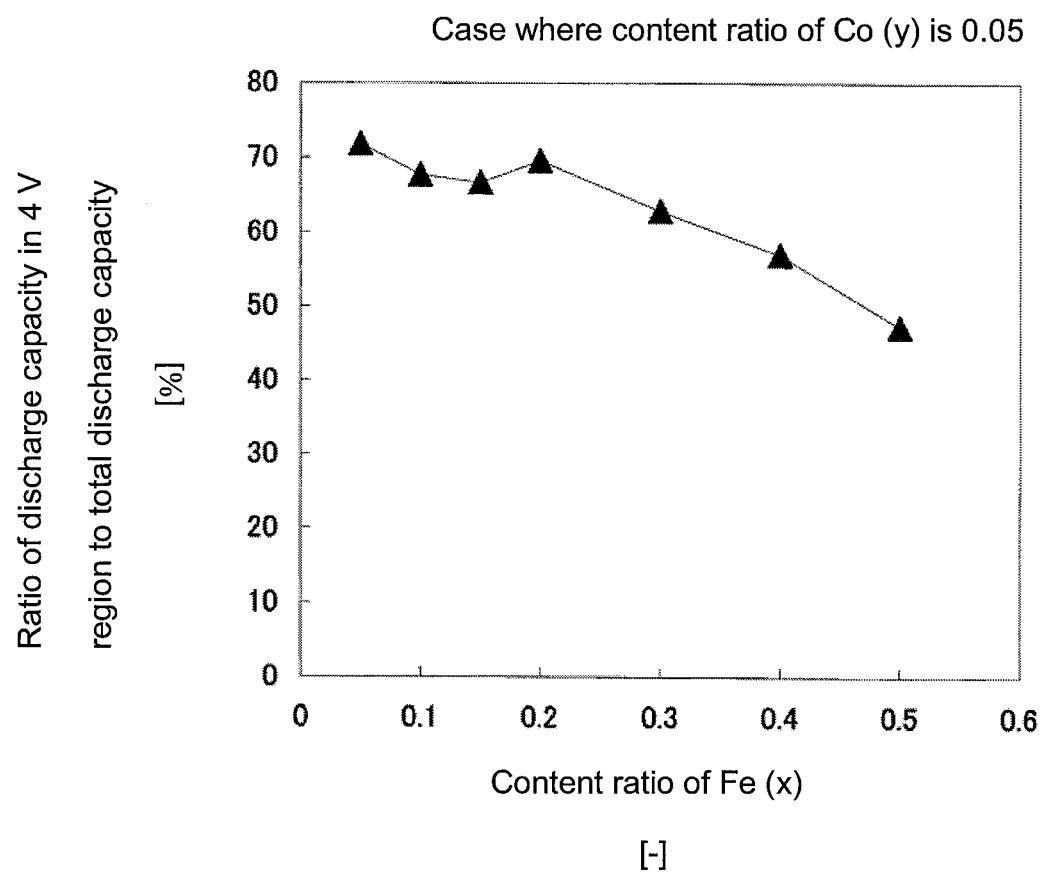
FIG. 3: A graph obtained by plotting "content ratio x of Fe" in the horizontal axis and "ratio of the discharge capacity around 4V to the total discharge capacity" in the vertical axis, regarding the measurement result in the case where the ratio of Co is 0.05, based on the test results of examples and comparative examples.
Figure 4:
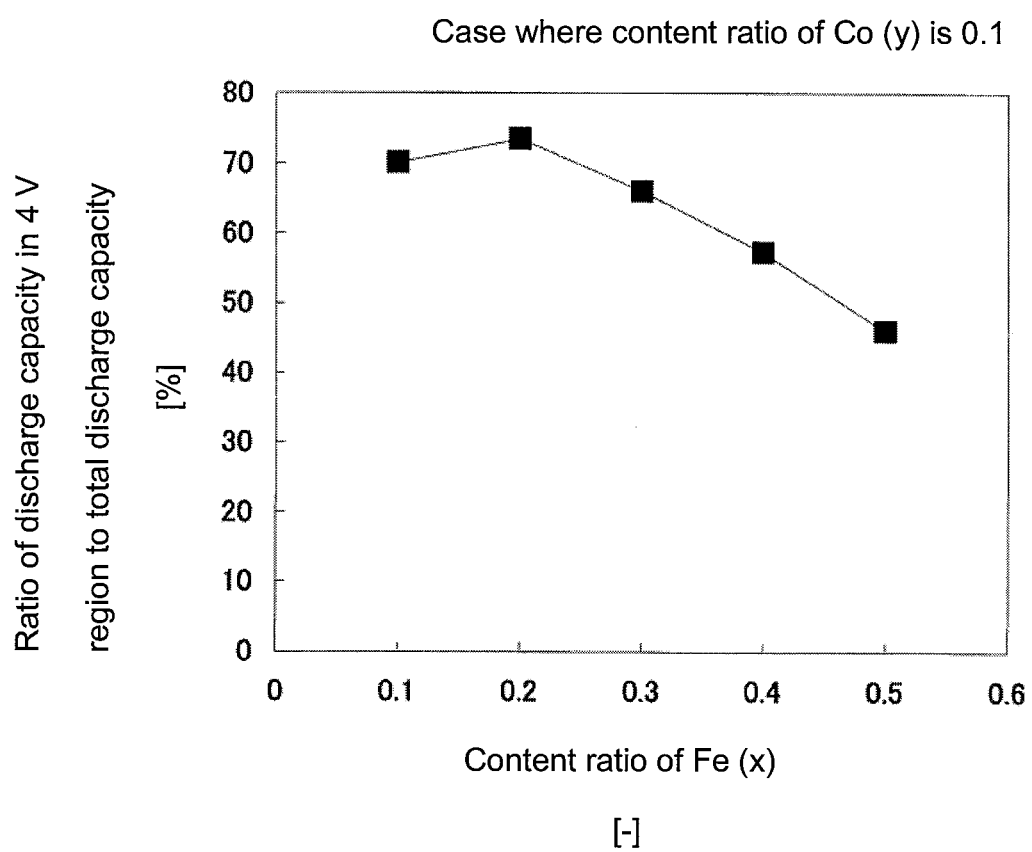
FIG. 4: A graph obtained by plotting "content ratio x of Fe" in the horizontal axis and "ratio of the discharge capacity around 4V to the total discharge capacity" in the vertical axis, regarding the measurement result in the case where the ratio of Co is 0.10, based on the test results of examples and comparative examples.

From the graphs shown in FIG. 2 to FIG. 4, it was acknowledged that in all of the case where the ratio of Co was 0.02 (FIG. 2), the case where the ratio of Co was 0.05 (FIG. 3), and the case where the ratio of Co was 0.1 (FIG. 4), if the "content ratio x of Fe" exceeded 0.2, the "ratio of discharge capacity around 4V to the total discharge capacity" was sharply decreased and if the "content ratio x of Fe" was in a range of from 0.1 to 0.2, the "ratio of discharge capacity around 4V to the total discharge capacity" was maintained at a high level.

Figure 5:
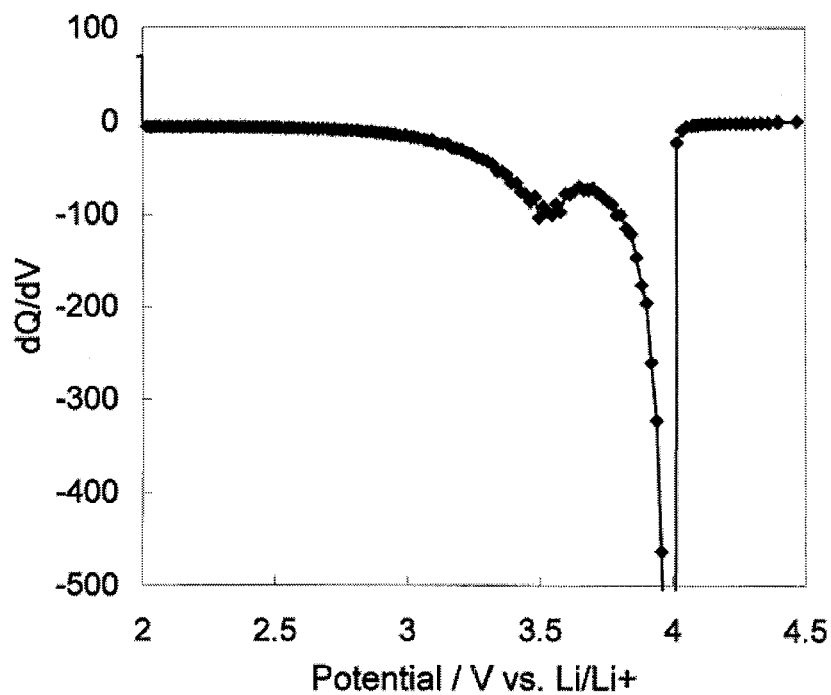
FIG. 5: A graph showing the result of measurement of the dQ/dV curve of a battery using a positive active material of Example 7.
Figure 6:
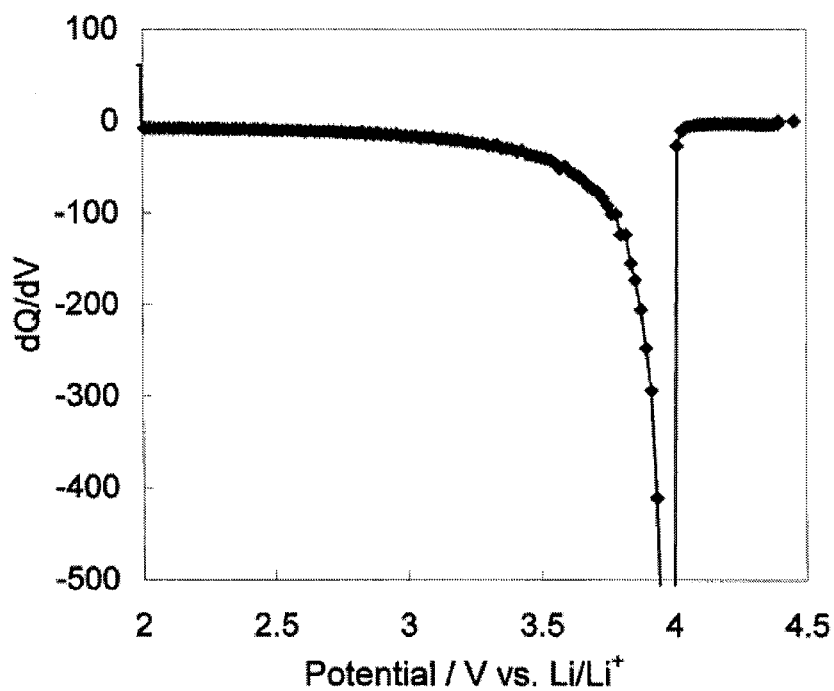
FIG. 6: A graph showing the result of measurement of the dQ/dV curve of a battery using a positive active material of Comparative Example 6.

Further, when the dQ/dV curve was measured for the respective batteries using the positive active material of Example 7 and the positive active material of Comparative Example 6, the results shown in the graphs of FIG. 5 and FIG. 6 were obtained.

As compared with FIG. 5 and FIG. 6 with each other, it was acknowledged that in the dQ/dV curve of Example 7 showed a folding point around 3.5 V besides that around 4 V, whereas in the dQ/dV curve of Comparative Example 6 showed no folding point besides that around 4 V. That is, in the case where two stages were observed in the discharge region, such two folding points were observed in the dQ/dV curve and therefore, it was supposed that the presence or absence of two stages could be judged based on the measurement of the dQ/dV curve.

The mechanism of the configuration of the present invention is not necessarily apparent; however some can be assumed. That is, it is possible to assume that electron state in the bulk of $LiMn_{1-x}Fe_xPO_4$ particles or the electron conductivity of the particle surfaces is improved by addition of Co. Alternatively, since it is found that the discharge potential in the 4 V region tends to be slightly improved more along with the amount of Co to be added is increased, it is also possible to assume that the electron state is changed.

Industrial Applicability

The present invention is suitable for application to the field where particularly high capacity is required, in industrial batteries such as electric vehicle that are highly expected in future developments, and the industrial applicability of the present invention is remarkably significant.

The invention claimed is:

1. A positive active material for a lithium secondary battery comprising a lithium transition metal phosphate compound represented by the following general formula (1):

$$LiMn_{1-x-y}Fe_xCo_yPO_4 (0.1 \leq x \leq 0.2, 0.05 \leq y \leq 0.2) \quad (1),$$

and the lithium secondary battery having 63% or higher ratio of discharge capacity in the discharge potential around 4 V to the total discharge capacity in a graph obtained by plotting the relation of the discharge capacity and the discharge potential.

2. The positive active material for a lithium secondary battery according to claim 1, wherein x satisfies $0.15 \leq x \leq 0.2$.

3. The positive active material for a lithium secondary battery according to claim 1, wherein y satisfies $0.05 \leq y \leq 0.1$.

4. A lithium secondary battery comprising a positive electrode containing the positive active material according to claim 1, a negative electrode, and a nonaqueous electrolyte.

5. The lithium secondary battery according to claim 4, having an approximately flat stage in a discharge region around 4 V and in a discharge region around 3.4 V, respectively.

6. The lithium secondary battery according to claim 4, having 70 mAh/g or more in a discharge region around 4 V at discharge current of 0.1 ItmA.

7. The positive active material for a lithium secondary battery according to claim 1, wherein the positive active material is in the form of particles with primary particles of 1 to 500 nm.

8. The positive active material for a lithium secondary battery according to claim 1, wherein the positive active material is in the form of particles and carbon loaded in surfaces of the particles.

9. The positive active material for a lithium secondary battery according to claim 1, wherein the positive active material is synthesized by a hydrothermal synthesis.

* * * * *